(12) United States Patent
Wu et al.

(10) Patent No.: US 9,247,551 B2
(45) Date of Patent: Jan. 26, 2016

(54) COGNITIVE SIMO NETWORK ACCESS METHOD BASED ON COOPERATIVE RELAY

(75) Inventors: Qihui Wu, Jiangsu (CN); Jinlong Wang, Jiangsu (CN); Yang Yang, Jiangsu (CN); Yuming Zhang, Jiangsu (CN)

(73) Assignee: PLA UNIVERSITY OF SCIENCE AND TECHNOLOGY, Jiangsu (CN)

( * ) Notice: Subject to any disclaimer, the term of this patent is extended or adjusted under 35 U.S.C. 154(b) by 538 days.

(21) Appl. No.: 13/520,171

(22) PCT Filed: Jun. 30, 2011

(86) PCT No.: PCT/CN2011/076724
§ 371 (c)(1),
(2), (4) Date: Nov. 26, 2012

(87) PCT Pub. No.: WO2013/000167
PCT Pub. Date: Jan. 3, 2013

(65) Prior Publication Data
US 2013/0065511 A1 Mar. 14, 2013

(30) Foreign Application Priority Data
Jun. 29, 2011 (CN) .......................... 2011 1 0178680

(51) Int. Cl.
H04W 72/00 (2009.01)
H04B 7/14 (2006.01)
H04W 72/08 (2009.01)
H04B 7/02 (2006.01)

(52) U.S. Cl.
CPC ............ *H04W 72/082* (2013.01); *H04B 7/026* (2013.01)

(58) Field of Classification Search
CPC ............ H04B 7/026; H04B 2201/692; H04W 72/082
USPC ....................................... 455/7, 454
See application file for complete search history.

(56) References Cited

U.S. PATENT DOCUMENTS

| | | | |
|---|---|---|---|
| 2009/0047916 A1* | 2/2009 | Haykin ..................... | 455/115.1 |
| 2012/0135772 A1* | 5/2012 | Demessie et al. .......... | 455/511 |
| 2012/0135780 A1* | 5/2012 | Sun et al. .................. | 455/522 |
| 2013/0029706 A1* | 1/2013 | Sachs et al. ................ | 455/501 |

* cited by examiner

*Primary Examiner* — Ankur Jain
*Assistant Examiner* — Xin Jia
(74) *Attorney, Agent, or Firm* — Global IP Services; Tianhua Gu

(57) ABSTRACT

The invention relates to a cognitive SIMO network access method based on cooperative relay, wherein a cognitive base station collects channel responses in a network and judges whether the cognitive users can cooperate with a primary user to achieve the target transmission rate required by the primary user or not, if so, a cognitive SIMO network is accessible to a frequency band licensed to the primary user; otherwise, the cognitive SIMO network is non-accessible. The access method can enable a plurality of the cognitive users and the primary user to simultaneously use the same licensed spectrum in the same geographical position, on the premise of ensuring the target transmission rate of the primary user, and further improve the utilization efficiency of the spectrum as far as possible. As the access method is based on cooperative communication, the nearer the distance from the cognitive network to the primary network is, the greater the network throughput can be achieved; and furthermore, a large-range network coverage can be realized, so the deficiencies in the existing cognitive radio access ways are made up.

2 Claims, 1 Drawing Sheet

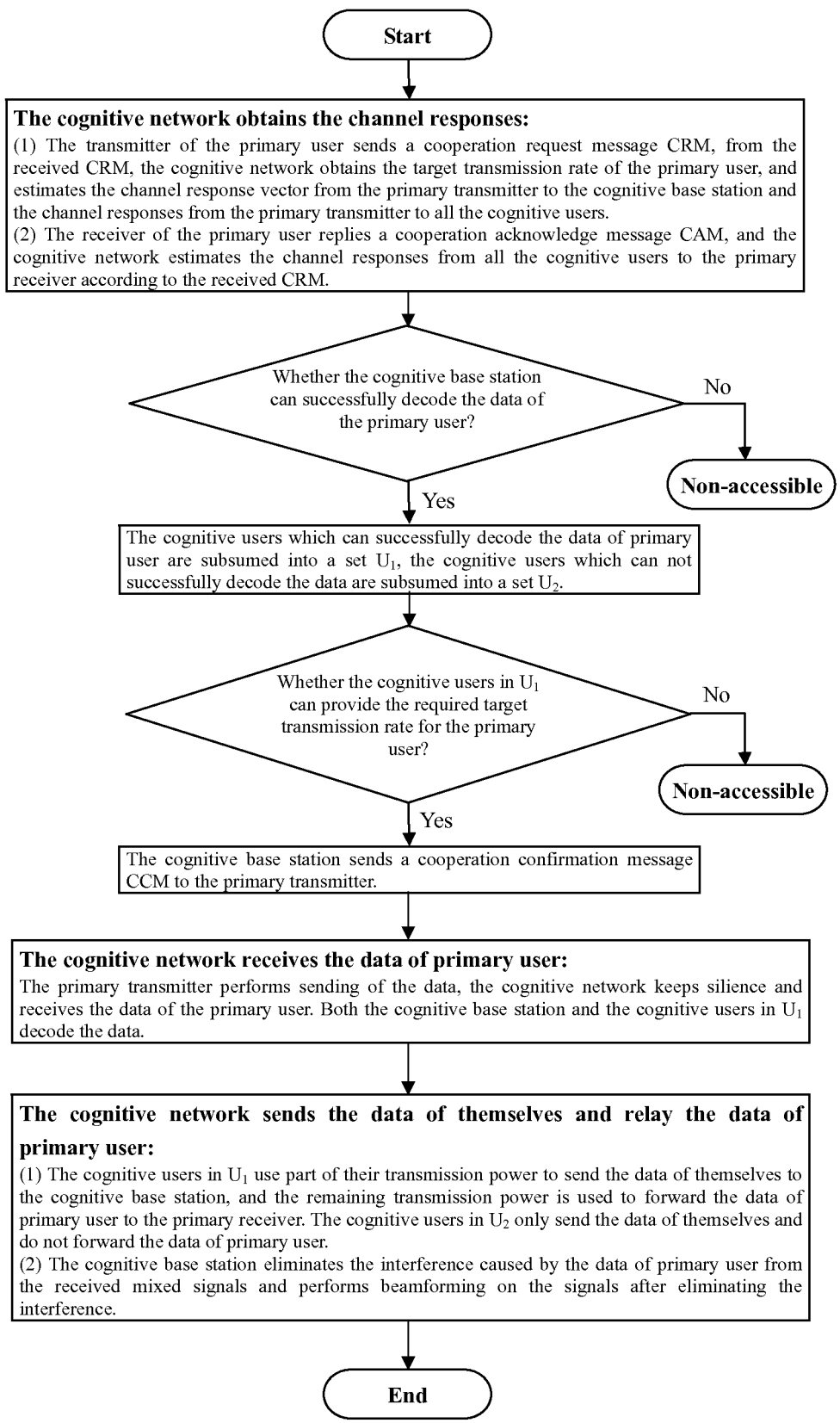

COGNITIVE SIMO NETWORK ACCESS METHOD BASED ON COOPERATIVE RELAY

CROSS REFERENCE TO RELATED PATENT APPLICATION

The present application is the US national stage of PCT/CN2011/076724 filed on Jun. 6, 2011, which claims the priority of the Chinese patent application No. 201110178680.2 filed on Jun. 29, 2011, which application is incorporated herein by reference.

FIELD OF THE INVENTION

The invention belongs to the technical field of cognitive radio and specifically relates to a new cooperative relay-based cognitive radio access method applied in a cognitive single-input multiple-output (referred to as SIMO) network.

BACKGROUND OF THE INVENTION

Cognitive radio is one of the most popular wireless techniques. The emergence of the cognitive radio has changed the spectrum using way of exclusively using spectrum resources by a licensed user. Each cognitive user can perform interactive perception with the wireless communication environment and automatically changes its transmit-receive parameters, so that the authorized spectrum can be dynamically reused on the premise of ensuring the normal communication of the licensed user (primary user) and the utilization efficiency of the spectrum can be significantly improved. In addition, a multi-antenna way is recognized as one of the required technical schemes for further high-speed wireless networks. A multi-antenna communication system increases space dimension on the basis of original frequency domain, time domain and code domain, with the advanced space-time signal processing technologies, its capacity can be upgraded by times without increasing bandwidth and transmission power, in addition, the anti-interference and anti-fading performances of the communication system can be simultaneously enhanced, so that the scarce spectrum can be effectively eased and high-speed business support can be further provided. Both as the effective means for improving the spectrum efficiency, the combination of the multi-antenna technique and the cognitive radio technique can further realize very broad application prospects.

At present, there are two well-known spectrum access models for cognitive radio, namely the spectrum hole-based opportunistic spectrum access and the interference temperature-based spectrum sharing.

The spectrum hole-based opportunistic spectrum access is as follows: spectrum resources which are not used by the primary user in specific positions at specific times are called as spectrum holes, and the opportunistic spectrum access manner utilizes the spectrum holes to communicate, which is the direct realization of cognitive radio. This kind of access way does not need to control the transmission power, but a high-precision spectrum detection technique is required in the cognitive network; and when the traffic in primary network is busy, it is very difficulty to obtain the communication opportunity in the opportunistic spectrum access model.

The interference temperature-based spectrum sharing is as follows: interference temperature is defined at the front end of radio frequency of a wireless receiver, which is used for measuring the interference received by a receiver in a certain geographical position within a certain frequency band, and the maximum interference temperature which can be tolerated by normal communication of the receiver is called as an interference temperature boundary. As long as the interference from the cognitive network to the primary receiver can be controlled within the interference temperature boundary, the licensed frequency band can be reused by the cognitive user without affecting the normal communication of the primary user. By utilizing this kind of access way, the cognitive network and the primary user can simultaneously use the same licensed frequency band in the same position, but the transmission power of the cognitive network must be controlled to meet the interference temperature boundary of the primary user, so that the spectrum sharing way can not realize a large-range network coverage and the communication performance is very poor when the distance to the primary network gets shorter.

SUMMARY OF THE INVENTION

The invention aims at providing a new cooperative relay-based assess scheme for the uplink of a multi-antenna cognitive network, namely a cognitive SIMO network, to overcome the problems of difficult access and poor communication in the existing cognitive radio access methods. The cooperation-based access method allows the cognitive users and the primary user to simultaneously use the same licensed spectrum in the same position, furthermore, a large-range network coverage can be realized and great network throughput can be obtained when the distance to the primary network is shorter, which makes up the deficiencies in the existing cognitive radio access methods.

The invention is realized through the following technical scheme:

The invention relates to a cognitive SIMO network access method based on cooperative relay, wherein a cognitive base station collects channel responses in the network and judges whether cognitive users can cooperate with the primary user to achieve the target transmission rate required by the primary user or not, if so, a cognitive SIMO network is accessible to the licensed frequency band; otherwise, the cognitive SIMO network is non-accessible. The cognitive SIMO network access method comprises the following steps:

Step 1: the transmitter of the primary user broadcasts a cooperation request message (referred to as CRM), from the received CRM, the cognitive base station estimates the M-dimensional channel response vectors $h^{pb}$ from the primary transmitter to the cognitive base station, all the cognitive users estimate the channel responses $h_c^{pc}$, c=1, 2, ..., N from the primary transmitter to the c th cognitive user. In addition, from the received CRM, the cognitive base station obtains the target transmission rate $R_{pk}$ of the primary user. All the cognitive users send the estimated values $h_c^{pc}$, c=1, 2, ..., N to the cognitive base station. Wherein M represents the number of antennas configured in the cognitive base station, and N represents the number of cognitive users in the cognitive network;

Step 2: the receiver of the primary user makes a response to the CRM and replies a cooperation acknowledge message (referred to as CAM) to the primary transmitter, and all the cognitive users estimate the channel responses $h_c^{cp}$, c=1, 2, ..., N from the cognitive users to the primary receiver according to the received CAM;

Step 3: the cognitive base station judges whether the SIMO network has the ability of cooperating with the primary user to achieve the target transmission rate of the primary user or not:

Firstly, the cognitive base station judges whether the cognitive base station and all the cognitive users can successfully decode the data of the primary user or not;

(a) if the data transmission rate obtained by the cognitive bas station is greater than the target transmission rate of the primary user, namely the condition ½ log(1+$p_p\|h^{pb}\|^2/\sigma_b^2)\geq R_{pk}$ is met, the cognitive base station can successfully decode the data of the primary user. Wherein $p_p$ represents the transmission power of the primary transmitter, and $\sigma_b^2$ represents the channel noise power received by the cognitive base station;

(b) if the data transmission rate obtained by the c th cognitive user is greater than the target transmission rate of the primary user, namely the condition ½ log(1+$p_p|h_c^{pc}|^2/\sigma_c^2)\geq R_{pk}$ is met, the c th cognitive user can successfully decode the data of the primary user and the c th cognitive user is subsumed into a set $U_1$, and otherwise, the c th cognitive user is subsumed into a set $U_2$. Wherein $\sigma_c^2$ represents the channel noise power received by the c th cognitive user, the set $U_1$ represents the set of the cognitive users capable of successfully decoding the data of the primary user, and the set $U_2$ represents the set of the cognitive users incapable of successfully decoding the data of the primary user;

If the cognitive users in the set $U_1$ can provide the target transmission rate required by the primary user, namely the condition $$\frac{1}{2}\log\left(1 + \sum_{c \in U_1} p_{c,max} g_c^{cp} / \sigma_p^2\right) > R_{pk}$$

can be met, and simultaneously the cognitive base station can also successfully decode the data of the primary user, the cognitive SIMO network is accessible to the frequency band licensed to the primary user, otherwise, the cognitive SIMO network is non-accessible. If the cognitive SIMO network is accessible, the cognitive base station sends a cooperation confirmation message (referred to as CCM) to the primary user. Wherein $\sigma_p^2$ represents the channel noise power at the receiver of the primary user and $p_{c,max}$ represents the peak transmission power allowed by the c th cognitive user.

In the invention, the method further comprises two steps after the cognitive base station sends the cooperation confirmation message CCM to the primary user:

Step 1: the cognitive base station and all the cognitive users receive the data of the primary user: after the transmitter and the receiver of the primary user receive the CCM, the primary transmitter starts to send its information data, the cognitive network keeps silence and receives data information of the primary user, and the cognitive base station and the cognitive users in the set $U_1$ decode the data of the primary user;

Step 2: the cognitive users send the data of themselves and simultaneously relay the data of the primary user: after the cognitive SIMO network completely receives the data of the primary user, the cognitive users in the set $U_1$ use part of their transmission power to send the data of themselves to the cognitive base station, and the remaining part of their transmission power is used for forwarding the data of the primary user to the primary receiver to meet the target transmission rate of the primary user; in addition, the cognitive users in the set $U_2$ do not forward the data of the primary user, and all their transmission power is used for sending the data of themselves to the cognitive base station. The cognitive base station eliminates the interference caused by the data of the primary user from the received mixed signals, and after the interference is eliminated, beamforming is performed on the received data for each cognitive user.

Compared with the prior art, the invention has the following advantages:

The invention designs a cognitive SIMO network access method based on cooperative relay, which can enable a plurality of the cognitive users and the primary user to simultaneously use the same licensed spectrum in the same geographical position on the premise of ensuring the target transmission rate of the primary user, and further improve the utilization efficiency of the spectrum as far as possible. As the access method is based on cooperative communication, the nearer the distance from the cognitive network to the primary network is, the greater the cognitive network throughput can be achieved; and furthermore, the large-range network coverage can be realized and the deficiencies in the existing cognitive radio access methods are made up.

BRIEF DESCRIPTION OF THE DRAWING

FIG. 1 is a flow diagram of the cognitive SIMO network access method based on cooperative relay in the invention.

DETAILED DESCRIPTION OF THE INVENTION

An embodiment of the invention is described as follows, system simulation adopts MatLab simulation, and the setting of parameters does not affect generality. A primary user system comprises a single-antenna transmitter and a single-antenna receiver, and the receiver is randomly distributed on a circumference with a radius of 200 m by taking the transmitter as the center of a circle. A cognitive network comprises a multi-antenna cognitive base station and three single-antenna cognitive users, and the three cognitive users are randomly distributed on the circumference with the radius of 200 m by taking the base station as the center of the circle. A logarithmic path loss model is used for modeling large-scale path loss of the channels, and the loss factor is set as 4; a Rayleigh fading model with mean 1 is used for modeling small-scale fading of the channels; the noise power at the receiver is set as $\sigma_b^2=\sigma_c^2=\sigma_p^2=110$ d Bm; the transmission power of the primary transmitter is 0 dBm; the three cognitive users have the same peak transmission power $p_{1,max}=p_{2,max}=p_{3,max}=20$ dBm; the number of antennas of the cognitive base station is set as M=3; and the distance between the cognitive base station and the transmitter of the primary user is set as 100 m.

The specific process of the embodiment is described by taking a following independent random test as an example. In the random test, Step 1: the transmitter of the primary user broadcasts a cooperation request message CRM, the cognitive base station and all the cognitive users keep silence. From the received CRM, the channel response vector $h^{pb}$ from the primary transmitter to the cognitive base station, the channel responses $h_1^{pc}$, $h_2^{pc}$, $h_3^{pc}$ from the primary transmitter to each cognitive user, and the target transmission rate of the primary user $R_{pk}=1$ bps/Hz are estimated. All the cognitive users report the estimated values $h_1^{pc}$, $h_2^{pc}$, $h_3^{pc}$ to the cognitive base station.

Step 2: the receiver of the primary user makes a response to the CRM and replies a cooperation acknowledge message CAM to the primary transmitter, the cognitive base station and all the cognitive users keep silence. All the cognitive users estimate the channel responses $h_1^{cp}$, $h_2^{cp}$, $h_3^{cp}$ from the cognitive users to the receiver of the primary user according to the received CAM.

In the random test, according to the assumed path loss and the path fading model, the above-mentioned channel responses which are randomly generated using Matlab simulation software are as follows:

$$h^{pb}=[1.1967\times10^{-4}, 1.117\times10^{-5}, 1.1488\times10^{-4}]^T$$

$$h_1^{pc}=2.9093\times10^{-5}, h_2^{pc}=2.6325\times10^{-5}, h_3^{pc}=1.7732\times10^{-5},$$

$$h_1^{cp}=1.535\times10^{-5}, h_2^{cp}=1.8538\times10^{-5}, h_3^{cp}=1.167\times10^{-5}$$

Step 3: the cognitive base station judges whether the cognitive network has the ability of cooperating with the primary user to achieve the target transmission rate of the primary user or not.

Firstly, the cognitive base station judges whether the cognitive base station and all the cognitive users can successfully decode the data of the primary user or not. If the condition ½ log(1+$p_p$∥$h^{pb}$∥²/$\sigma_b^2$)≥$R_{pk}$ is met, indicating that the transmission rate which can be obtained by the cognitive base station is greater than the target transmission rate of the primary user, then the cognitive base station can successfully decode the data of the primary user, and we can judge that the cognitive base station can successfully decode the data of the primary user in the random test. If the condition ½ log(1+$p_p$|$h_c^{pc}$|²/$\sigma_c^2$)≥$R_{pk}$ is met, indicating that the transmission rate obtained by the c th cognitive user is greater than the target transmission rate of the primary user, then the c th cognitive user can successfully decode the data of the primary user and the c th cognitive user is subsumed into a set $U_1$, otherwise, the c th cognitive user is subsumed into a set $U_2$, and we can judge that all the three cognitive users can successfully decode the data of the primary user in the random test, so $U_1$={1,2,3} and $U_2$ is an empty set. If the condition $$\frac{1}{2}\log\left(1+\sum_{c\in U_1}p_{c,max}g_c^{cp}/\sigma^2\right)>R_{pk}$$

can be met, indicating that the cognitive network can provide the target transmission rate required by the primary user, and we can further judge that the condition is met during the random test, and simultaneously, the cognitive base station can also successfully decode the data of the primary user, so the cognitive base station sends the cooperation confirmation message CCM to the primary user and agrees to help the primary user forward the data.

Step 4: the cognitive base station and all the cognitive users receive the data of the primary user: after the transmitter and the receiver of the primary user receive the CCM, the primary transmitter starts to send its information data, the cognitive network keeps silence and receives data of the primary user, in addition, the cognitive base station and the cognitive users in the set $U_1$ decode the data of the primary user. In the random test, the cognitive base station and all the three cognitive users decode the data of the primary user.

Step 5: the cognitive users send the data of themselves and simultaneously relay the data of the primary user: after the cognitive SIMO network completely receives the data of the primary user, the cognitive users in the set $U_1$ use part of their transmission power to send the data of themselves to the cognitive base station, and the remaining part of their transmission power is used for forwarding the data of the primary user to the primary receiver to meet the target transmission rate of the primary user; the cognitive users in the set $U_2$ do not forward the data of the primary user, and all the transmission power is used for sending the data of themselves to the cognitive base station. The cognitive base station eliminates the interference caused by the data of the primary user from the received mixed signals, and after the interference is eliminated, beamforming is performed on the received data of each cognitive user.

What is claimed is:

1. A cognitive SIMO network access method based on cooperative relay, characterized in that a cognitive base station collects channel responses in the cognitive network and judges whether cognitive users can cooperate with a primary user to achieve a target transmission rate required by the primary user or not, if so, the cognitive SIMO network is accessible to a frequency band licensed to the primary user; otherwise, the cognitive SIMO network is non-accessible, the cognitive SIMO network access method comprises the following steps:

Step 1: a transmitter of the primary user broadcasts a cooperation request message (referred to as CRM), from the received CRM, the cognitive base station estimates M-dimensional channel response vector $h^{pb}$ from a primary transmitter to the cognitive base station, all the cognitive users estimate channel responses $h_c^{pc}$=1, 2, ..., N from the primary transmitter to a c th cognitive user, in addition, from the received CRM, the cognitive base station obtains the target transmission rate $R_{pk}$ of the primary user, all the cognitive users send the estimated values $h_c^{pc}$, c=1, 2, ..., N to the cognitive base station; Wherein M represents a number of antennas configured in the cognitive base station, and N represents the number of cognitive users in the cognitive network;

Step 2: a receiver of the primary user makes a response to the CRM and replies a cooperation acknowledge message (referred to as CAM) to the primary transmitter, and all the cognitive users estimate channel responses $h_c^{cp}$, c=1, 2, ..., N from the cognitive users to the primary receiver according to the received CAM;

Step 3: the cognitive base station judges whether the SIMO network has ability of cooperating with the primary user to achieve the target transmission rate of the primary user or not:

Firstly, the cognitive base station judges whether the cognitive base station and all the cognitive users can successfully decode data of the primary user or not;

(a) if a data transmission rate obtained by the cognitive bas station is greater than the target transmission rate of the primary user, namely a condition ½ log(1+$p_p$∥$h^{pb}$∥²/$\sigma_b^2$)≥$R_{pk}$ is met, the cognitive base station can successfully decode the data of the primary user, wherein $p_p$ represents a transmission power of the primary transmitter, and $\sigma_b^2$ represents a channel noise power received by the cognitive base station;

(b) if the data transmission rate obtained by the c th cognitive user is greater than the target transmission rate of the primary user, namely the condition ½ log(1+$p_p$|$h_c^{pc}$|²/$\sigma_c^2$)≥$R_{pk}$ is met, the c th cognitive user can successfully decode the data of the primary user and the c th cognitive user is subsumed into a set $U_1$, and otherwise, the c th cognitive user is subsumed into a set $U_2$, wherein $\sigma_c^2$ represents the channel noise power received by the c th cognitive user, the set $U_1$ represents a set of the cognitive users capable of successfully decoding the data of the primary user, and the set $U_2$ represents a set of the cognitive users incapable of successfully decoding the data of the primary user;

If the cognitive users in the set $U_1$ can provide the target transmission rate required by the primary user, namely a condition $$\frac{1}{2}\log\left(1 + \sum_{c \in U_1} p_{c,max} g_c^{cp} / \sigma_p^2\right) > R_{pk}$$

can be met, and simultaneously the cognitive base station can also successfully decode the data of the primary user, the cognitive SIMO network is accessible to the frequency band licensed to the primary user, otherwise, the cognitive SIMO network is non-accessible, if the cognitive SIMO network is accessible, the cognitive base station sends a cooperative confirmation message (referred to as CCM) to the primary user, wherein $\sigma_p^2$ represents the channel noise power at the receiver of the primary user and $p_{c,max}$ represents the peak transmission power allowed by the c th cognitive user.

2. The cognitive SIMO network access method based on the cooperative relay according to claim 1, characterized in that the method further comprises two steps after the cognitive base station sends the cooperation confirmation message CCM to the primary user:

Step 1: the cognitive base station and all the cognitive users receive the data of the primary user: after the transmitter and the receiver of the primary user receive the CCM, the primary transmitter starts to send its information data, the cognitive network keeps silence and receives data information of the primary user, and the cognitive base station and the cognitive users in the set $U_1$ decode the data of the primary user;

Step 2: the cognitive users send the data of themselves and simultaneously relay the data of the primary user: after the cognitive SIMO network completely receive the data of the primary user, the cognitive users in the set $U_1$ use part of their transmission power to send the data of themselves to the cognitive base station, and the remaining part of their transmission power is used for forwarding the data of the primary user to the primary receiver to meet the target transmission rate of the primary user; in addition, the cognitive users in the set $U_2$ do not forward the data of the primary user, and all their transmission power is used for sending the data of themselves to the cognitive base station, the cognitive base station eliminates interference caused by the data of the primary user from received mixed signals, and after the interference is eliminated, beamforming is performed on the received data for each cognitive user.

* * * * *